Dec. 9, 1958  W. S. PRAEG  2,863,360
MACHINE AND METHOD FOR PRODUCING GEARS
Filed Aug. 23, 1954  3 Sheets-Sheet 1
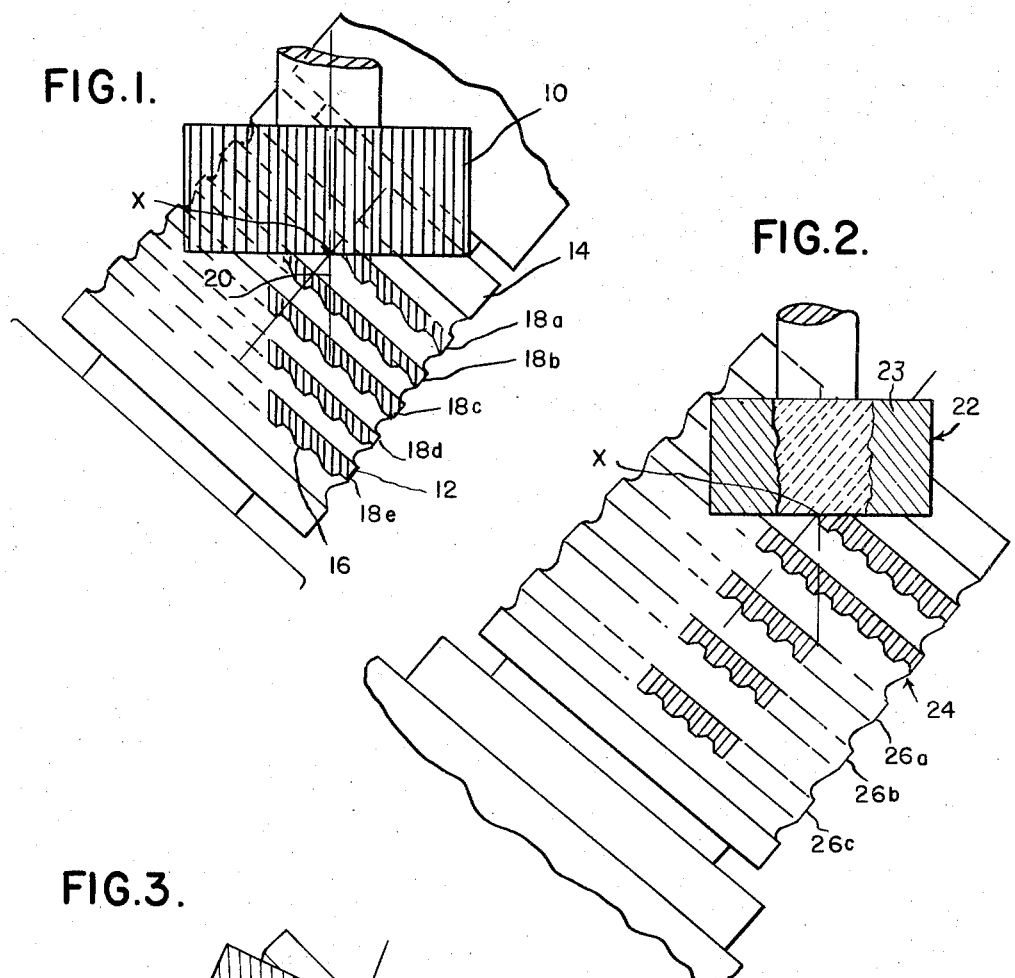
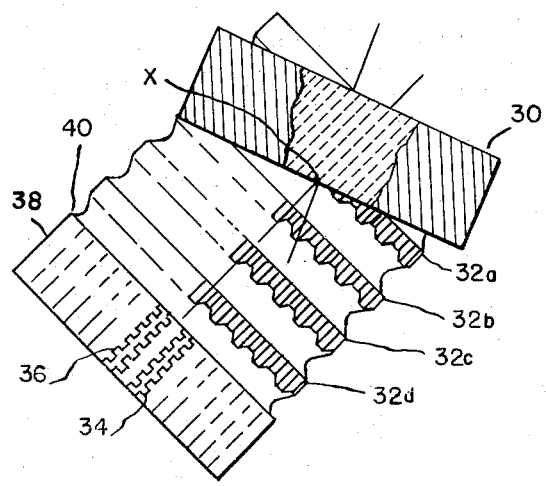
*INVENTOR.*
WALTER S. PRAEG
BY Whittemore,
Hulbert & Belknap
ATTORNEYS

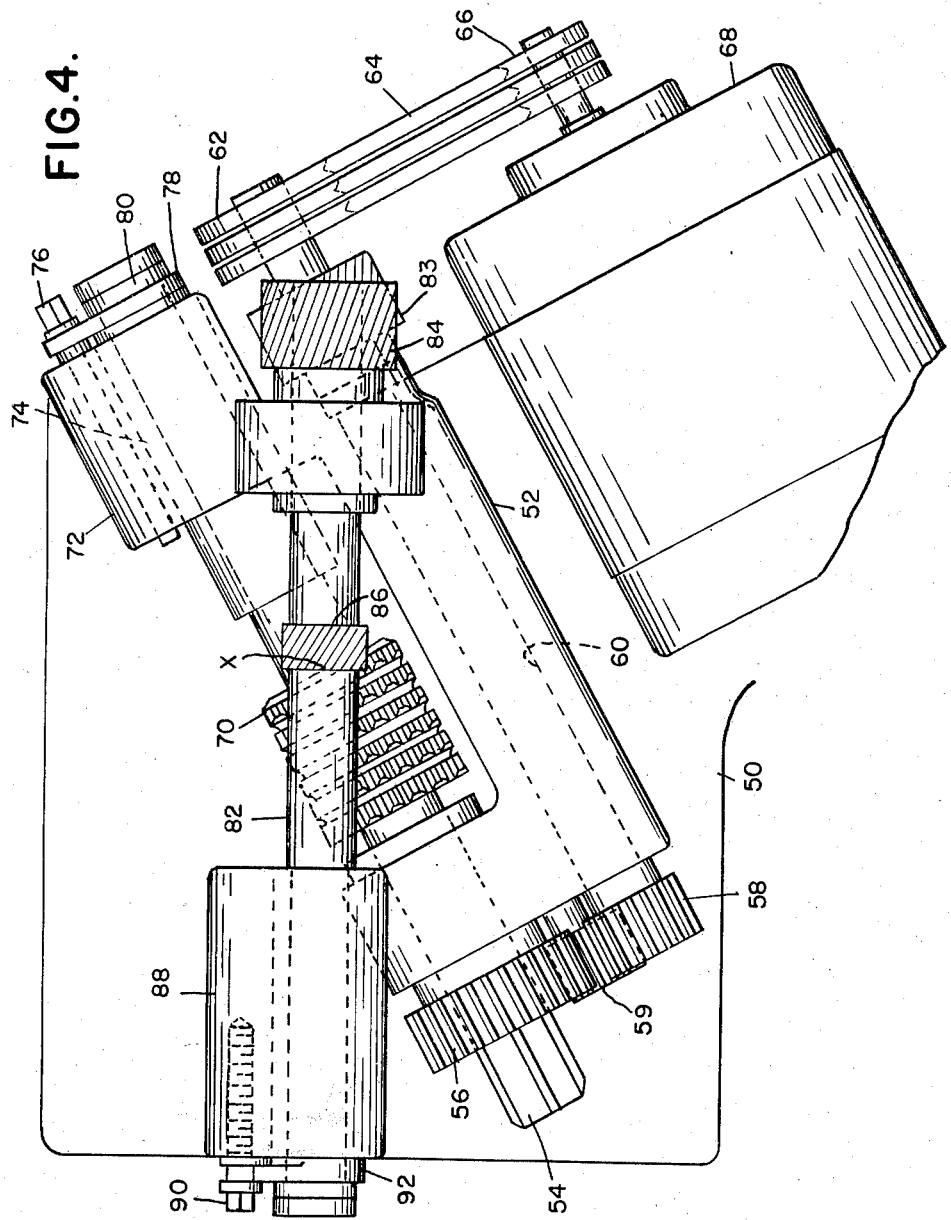

Dec. 9, 1958     W. S. PRAEG     2,863,360
MACHINE AND METHOD FOR PRODUCING GEARS
Filed Aug. 23, 1954     3 Sheets-Sheet 3
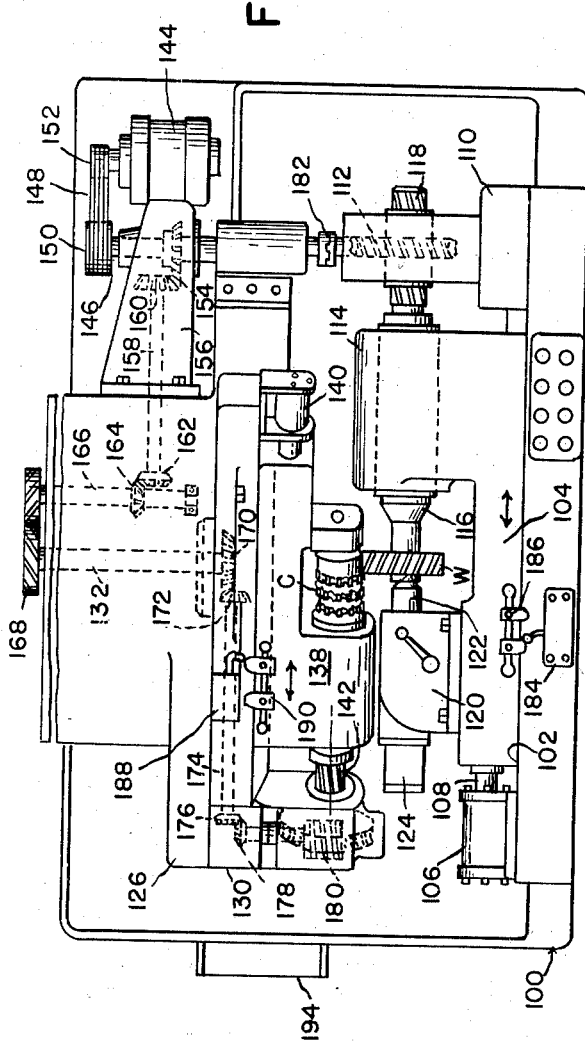
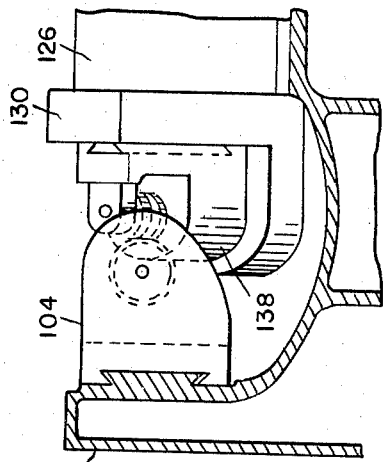
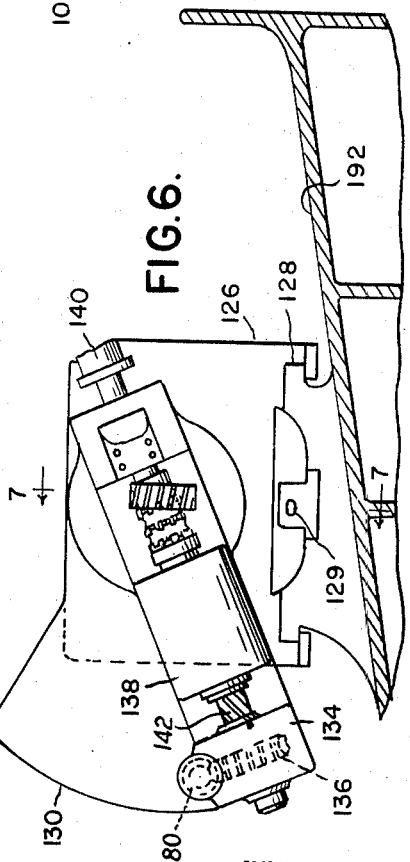
INVENTOR.
WALTER S. PRAEG
BY
ATTORNEYS United States Patent Office 2,863,360
Patented Dec. 9, 1958

2,863,360

MACHINE AND METHOD FOR PRODUCING GEARS

Walter S. Praeg, Detroit, Mich.

Application August 23, 1954, Serial No. 451,555

21 Claims. (Cl. 90—1.6)

The present invention relates to a machine for producing gears and more particularly, to a machine having the ability to rough gears to approximate dimension and thereafter to finish the gears accurately to final dimension and finish in a single operation.

It is an object of the present invention to provide an improved apparatus, method and tool for carrying out the combined gear roughing and finishing operation.

More specifically, it is an object of the present invention to provide a method, apparatus and tool for gear production which employs a rotary tool or cutter having a plurality of sets of cutting teeth or blades the teeth of each set being disposed in a plane perpendicular to the axis of the cutter, corresponding teeth of successive sets being disposed in a series aligned longitudinally of the cutter, the teeth of each series being progressively stepped, and the cutter including a final set of teeth of full size adapted to finish a work gear to final dimensions.

It is a further object of the present invention to employ the tool as described in the preceding paragraph in an operation in which the tool and a work piece are driven in accurately timed relation with the tool disposed with its axis non-intersecting and crossed with the axis of the work piece at an angle between 5 and 45 degrees, and feeding the cutter axially to cut teeth on the periphery of a workpiece, arresting axial advance of the cutter when the plane defined by the set of finished cutting teeth intersects centrally with the plane of one end of the gear, and thereafter advancing the work piece parallel to its axis to cause the finishing set of teeth to finish cut the generated teeth on the work piece from end to end.

It is a further object of the present invention to provide in conjunction with both the tool and cutter splined means supporting the same to permit axial movement thereof which is entirely independent of rotation without introducing errors or interference.

Other objects and features of the invention will become apparent as the description proceeds, especially when taken in conjunction with the accompanying drawings, wherein:

Figure 1 is a diagrammatic view illustrating the essential features of the improved method.

Figure 2 is a view similar to Figure 1 illustrating another relationship of parts.

Figure 3 is a view similar to Figure 1 illustrating yet another relationship of parts.

Figure 4 is an elevational view of simple mechanism for carrying out the operation disclosed herein.

Figure 5 is a fragmentary plan view of a practical embodiment of gear producing machine.

Figure 6 is a front elevational view partly in section illustrating the mounting of the cutter support.

Figure 7 is a fragmentary vertical section on the line 7—7, Figure 6.

Referring now to Figure 1 there is illustrated a work gear 10 in operating conjunction with a cutter 12 constructed in accordance with the present invention. The cutter 12 comprises generally an elongated cylindrical body which may be provided with a finished cylindrical pilot portion 14 at its smaller or entering end and provided with a plurality of radially stepped sets of teeth 16. Each set of teeth is disposed to occupy a plane perpendicular to the axis of the cutter, the progressively larger sets in the illustrated embodiment being designated 18a, 18b, 18c, and 18d. The teeth of each set are identical and the sets of teeth are so arranged that corresponding teeth in successive sets are disposed in a series aligned longitudinally of the cutter and the teeth of each series are stepped to take progressively deeper cuts. Thus for example, in Figure 1 where the cutter is designed for producing spur teeth on the gear 10, the series of teeth are disposed helically on the cutter, one such helical series of teeth being indicated by the construction line 20.

The work piece blank is positioned with its axis inclined to the axis of the cutter at an angle between 5 and 45 degrees. As a result of this, rotation of the cutter and of the gear produces a relative movement of the cutter teeth longitudinally of the gear. It is contemplated that the gear and cutter will be rotated together at substantial speeds such for example as a speed of beween 300 and 600 surface feet per minute.

During the roughing cut the gear and cutter are driven together in accurately timed relation and in the direction appropriate to meshed rotation between two gear-like parts having a number of teeth corresponding to the number produced on the work piece and the number of teeth in each set of cutting teeth on the cutter. As a result, each tooth of the cutter moves longitudinally of a tooth space on the work piece at substantial velocity as it rolls in and out of mesh therewith.

During the operation, as will subsequently be described, first the cutter and thereafter the gear are advanced axially. While it would be possible to so gear the cutter and gear together for timed rotation as to compensate for helical disposition of teeth on either the gear or cutter, or both, it is preferred to provide master lead guide means effecting rotation of the cutter or gear in addition to its geared rotation in accordance with its axial advance. Thus for example, in Figure 1 where the gear being produced has spur teeth, the spindle means supporting the gear for rotation and axial advance will be provided with a master lead such for example as provided by a spur or straight spline and corresponding spur spline-receiving nut. On the other hand, since in this illustrated embodiment of the invention the series of stepped cutter teeth are provided on a helix, the master lead associated with the cutter will have helical splines extending at the same lead as the series of teeth on the cutter. By virtue of this arrangement it is possible to connect the gear and cutter together for simultaneous rotation at relative speeds dependent only upon the number of teeth, considering both parts to operate together as gears. Also, this permits the axial feed of the gear and cutter to be varied as desired to take advantage of most efficient cutting operations, and axial feed may if desired be terminated at any mid-point in the cut and the part being fed retracted without introducing interference.

In the embodiment of the invention illustrated in Figure 1 the cutter is fed from initial position in which the teeth of set 18a start to cut, through the position illustrated until the plane of the circular set of cutting teeth 18e advances to the point X, or in other words, until the plane of the finishing teeth in the set 18e intersects centrally with the plane at the adjacent end of the work piece 10. At this time advance of the cutter is terminated and the cutter is continued in rotation while it is firmly held against axial movement. At this stage of the operation the gear teeth will have been roughed, the tooth spaces however being of non-uniform depth from end to end. The tooth spaces at the lower end of the gear 10 as seen in Figure 1 will have been machined to substantially full depth but the tooth spaces at the upper end of the gear as illustrated in this figure will have been roughed out to a somewhat lesser depth, leaving additional material to be removed by the finishing operation.

At this stage of the operation, which is the roughing portion of the cycle, the gear 10 is advanced axially downwardly as illustrated in the figure until the upper side of the gear reaches the point X. At this time the entire length of the gear teeth will have passed through the plane of the finishing teeth of the cutter so that the gear teeth will have been machined by an operation which includes an initial roughing operation and a finishing operation following immediately thereafter.

Referring now to Figure 2, a similar arrangement is illustrated. In this case, however, the gear blank 22 is illustrated as helical and accordingly the longitudinally aligned series of teeth on the cutter 24 preferably are parallel to the axis thereof. In the diagrammatic illustration of the gear blank 22, teeth 23 are illustrated as of left hand helix, those shown in dotted lines in the central broken away portion being at the underside of the blank and in meshing relation with the teeth of the cutter. The operation is identical with that previously described except that the cutter is provided with a straight or spur type master lead device so that its axial advance does not affect its rotation. On the other hand, the helical gear is provided with a helical master lead device so that its axial advance imparts additional rotation thereto. In this figure there is also illustrated a cutter having three identical sets of finishing teeth designated 26a, 26b, and 26c. When the cutter is new advance of the cutter is terminated when the plane occupied by the set of finishing teeth 26a reaches the point X, after which the work gear is advanced axially to complete the finishing operation. However, as the teeth in the finishing set 26a become dull this set may be used as a final roughing set and the cutter advanced until the plane occupied by the finishing teeth in set 26b reaches the point X. A similar arrangement is employed to take advantage of the final finishing set 26c. This of course permits the cutter to be used for a much longer period of time without sharpening.

Referring now to Figure 3, a similar arrangement is illustrated for roughing and finishing helical teeth on a work piece 30. In this case the cutter is shown as provided with roughing sets of teeth 32a, 32b, 32c, and 32d. Beyond set 32d the cutter is provided with normal gear teeth 34 interrupted by vertically extending gashes 36 of the type familiar in the industry and employed as shaving teeth. The section 38 of the cutter carrying the serrated teeth 34 is provided with cutting edges as indicated at 40, these cutting edges constituting a final finishing set of cutting teeth. However, following the final finishing cut performed by these cutting edges, a shaving operation is performed which will produce shaved gear teeth. According to this embodiment of the invention the gear in a single operation has teeth formed thereon by roughing, followed by a finishing operation, followed by a final shaving operation.

Referring now to Figure 4 there is illustrated simplified structure for carrying out the operation as described. In this case there is provided a frame 50 having a tool support 52 thereon mounting a straight or spur splined drive shaft 54 slidably received in a corresponding spline in a gear 56 connected through an idle gear 59 to a drive gear 58 carried by a shaft 60 which at its opposite end carries sheaves 62. The sheaves are connected by belting 64 to a driving sheave 66 driven by a motor 68. Connected to the drive shaft 54 is a cutter 70 which may be either spur or helical as previously explained, but which will preferably be a spur type cutter if associated with the straight spur splined drive shaft as described. A tailstock 72 is carried by the frame 50 through which the shaft 74 is slidable. In order to effect axial movement of the shaft 74 and the cutter and splined drive shaft associated therewith, the tailstock 72 has an elongated screw 76 provided with collars engaging opposite sides of a laterally extending portion of a bracket 78 rotatably received between suitable collars one of which is indicated at 80, on the outer end of the shaft 74. Accordingly, rotation of the screw 76 will effect axial advance of the cutter. The outer end of the screw as indicated is square for the reception of a hand tool such for example as a crank. The motor 68 is also effective to drive the work spindle 82 in rotation. For this purpose the shaft 60 carries a gear 83 meshing at crossed axes with a driven gear 84 provided with an internal spline which in the present instance will be helical for the production of helical teeth on the work gear 86. The right hand end of the work support spindle 82, which may be a separate member, is provided with helical splines for association with the internal helical spline of the gear 83. A tailstock 88 is provided with a feed screw 90 associated with the spindle 82 by a bracket 92 corresponding to the bracket 78 previously described.

Operation of the motor drives the cutter through the gears 58, 59, 56, and through the splined drive shaft 54. The motor also drives the work through the gears 83 and 84 and the splined portion of the shaft 82. These gear drives are so related that the gear and cutter rotate together as gears in accordance with the number of teeth thereon. In order to carry out the roughing operation the screw 76 is rotated in the appropriate direction to draw the cutter upwardly and to the right until the final finishing set of teeth reaches the point X at the left hand side of the gear. At this time further advance of the cutter is terminated and the feed screw 90 is rotated to effect movement of the gear 86 to the left until the entire length of the teeth thereon has passed through the plane of the finish cutting teeth on the cutter, at which time the operation is complete.

The foregoing apparatus has been described merely as a simple device for carrying out the required movements to produce the novel gear finishing operation. For a practical embodiment of a machine tool which may be rendered more or less automatic, reference is now made to Figures 5–7.

As seen in these figures the machine comprises a frame 100 including a wall 102 on which a work supporting slide 104 is mounted for reciprocation from right to left as seen in Figure 5. Mounted on the wall 102 is a hydraulic cylinder 106 having a piston therein provided with a piston rod 108 connected to the slide 104 for reciprocating the same. Mounted on the wall 102 is a block 110 having a worm wheel and nut member 112 carried thereby for rotation. On the slide 104 is a headstock 114 receiving a shaft 116 on which the work W is mounted. At the right hand end, as seen in Figure 5, the shaft 116 is connected to or formed with a master lead bar portion 118 having helically extending splines thereon of the same lead as the teeth to be formed on the work piece W. A tailstock 120 is provided including a work engaging center 122 operably connected to a clamping air cylinder 124.

In back of the wall 102 is an adjustable tool supporting base 126 which as best seen in Figure 6, is mounted on ways indicated at 128 and provided with suitable adjusting means such as the feed screw device indicated at 129.

Mounted at the front of the tool base is a mounting plate 130 adapted to be angularly adjustable about the axis of a shaft 132 later to be described. On the plate is provided a block 134 carrying a worm wheel and nut member 136 provided with internal splines which may be spur or helical dependent upon the arrangement of teeth on the cutter C. Mounted on the plate 130 for reciprocation in a direction parallel to the axis of the worm wheel and nut member 136 is a tool slide 138. The plate 130 also carries a hydraulic cylinder 140 connected to the tool slide 138 so as to reciprocate the same. The cutting tool C is carried by the tool slide 138 and has rigidly coupled thereto a master lead bar 142 which is operatively received within the worm wheel and nut member 136.

A motor 144 is mounted on the frame and is connected to a shaft 146 through belting 148 and sheaves 150 and 152. Splined to the shaft 146 is a bevel gear 154 carried in a bracket 156 bolted or otherwise secured to the tool base 126, the tool base also carrying a shaft 158 having a bevel gear 160 meshing with the bevel gear 154. At its opposite end the shaft 158 carries a bevel gear 162 meshing with a bevel gear 164 on a shaft 166. A set of change gears indicated at 168 interconnects shaft 166 to the shaft 132 previously described. The shaft 132 carries a bevel gear 170 meshing with a bevel gear 172 carried by a shaft 174 which in turn carries a bevel gear 176 meshing with a bevel gear 178 connected to a worm 180 which meshes with worm teeth on the exterior surface of the worm wheel and nut member 136.

The shaft 146 is connected by a coupling 182 to a worm meshing with worm gear teeth formed on the exterior of the worm wheel and nut member 112.

From the foregoing construction it will be apparent that the single motor 144 effects positive rotation of the cutter C and work W in accurately timed relationship. Moreover, master lead bar means are provided for both the cutter and work so that the cutter and work may be reciprocated axially without reference to their speed of rotation or in fact, may be reciprocated axially at rest without introducing interference. The cycle of the machine is as above described in that the cutter C is first reciprocated from the position illustrated in Figures 5 and 6 to a position in which the plane of the cutting edges of the circular series of finishing teeth reach the left hand side of the work blank as illustrated in these figures. At this time the teeth of the work gear will have been roughed and ready to receive the finishing cut. This is accomplished by arresting the cutter slide 138 and shifting the work spindle slide 104 to the left to cause the work piece to be traversed through the operating plane of the finishing edges of the series of cutting teeth on the cutter C.

Suitable automatic control devices may be provided to cause the machine to cycle automatically including a switch 184 and adjustable actuating dogs 186 carried on the work slide, and a switch 188 and adjustable actuating dogs 190 carried by the cutter slide.

It will be observed that the floor 192 of the frame inclines to the left, as seen in Figure 6, and the frame is provided with an opening 194 for chip disposal. It will also be observed that the cutter base 126 is adjustable toward and away from the axis of the work support so as to accommodate gears of different size.

The present design also contemplates that the blocks 110 and 134 may be identical.

The crossed axes relationship between the cutter and work piece is adjusted by making angular adjustment of the plate 130. This adjustment takes place about the axis of the shaft 132 so that it does not interfere with the driving relation of the bevel gearing illustrated. As previously described, the cutter will be positioned with its axis making an angle of between 5 and 45 degrees with respect to the axis of the work support.

From the foregoing general description it will have become apparent that the novel method and machine involves the use of a tool similar in appearance to a broach except that the tool revolves at relatively high speed in timed relationship with the work. Actually of course, the tool is quite different from a broach in that consecutive longitudinally aligned teeth in adjacent sets of teeth are stepped radially several hundredths of an inch, whereas in broaches of course the progressive increments of height in adjacent longitudinally aligned teeth are in a definitely smaller range.

The cutting action is achieved through a combination of rotation and crossed axes. The cutting edge of the tool is at an angle preferably between 20 and 30 degrees to the face of the part being cut and having a component axial to the part being cut during the crossed axes relationship. Due to the combination of the substantial crossed axes relationship between the gear and cutter and to the relatively rapid surface speed thereof, efficient and rapid cutting takes place. During this cutting each blade or tooth of the cutter has a very substantial component of motion longitudinally of the work, so that it moves in an efficient cutting stroke longitudinally of a tooth space as it rolls into and out of the tooth space. Feed is accomplished by pushing the tool through the rotating part at a predetermined feed similar to broaching or shaving. However, since the series of teeth on the tool have side lands it is apparent that after the tool is anchored in the part by its first few teeth, natural guiding action will then take over and complete the teeth to proper helix angle as determined by the cutter and master lead bars.

For example, the first row of teeth on the tool may be designed to cut a groove approximately .040 inch deep. The next row, being approximately ⅜ inch behind the first row, will cut the same groove .050 inch deeper or to a total depth of .090 inch. This progressive cutting is continued until the teeth of the work gear have been cut to the total required depth. Preferably, the cutter is designed with respect to the work so as to have not less than two teeth in engagement at all times so as to maintain good guiding action during cutting. After all of the roughing teeth have gone through the work piece to bring the finishing set of teeth into proper position, axial advance of the cutter spindle will be arrested. At this time the work spindle's advance is commenced advancing the work piece across the finishing teeth their full face width bringing all tooth elements to correct size and shape. The work spindle feed can be at a rate different from the feed of the cutter spindle so as to give a desired accuracy and finish to the elements necessary for final shaving or finishing operations. If desired, several finish cycles can be used for very accurate gears and extremely fine finishes obtained if found necessary.

Accuracy of lead may be maintained in the finishing operation by guiding action on the work spindle in combination with the master lead bar associated therewith.

A unique feature of the operation allows all roughing to be done by roughing teeth and all finishing to be done by finishing teeth provided on a single simple tool.

It is pointed out again that the rate of feed either of the cutter during the roughing operation or of the work piece during the finishing operation, has no relationship to feed or helix angle, since this is compensated for by the use of the master lead bar devices. Feed can be varied during the cutting cycle without effecting accuracy of lead, which may be a very desirable feature for unusual types of gears or splines.

The simplicity of the cutting tool permits manufacture of the tool from carbides which is an important feature in providing tools of exceptionally long life.

Size of the finished work piece is controlled by the initial setting of the tool and it is not necessary to adjust or feed the cutter head toward the work during the cutting operation. The cutter slide is set by hand to the proper depth and is locked in place. This setting need not be changed so long as same gears are being cut until the tool is dull and needs replacing.

Reconditioning of the tool can be done in the plant of the user with the standard shop equipment. This is accomplished by face grinding similar to the operation performed in sharpening broaches, and size is not disturbed by sharpening.

While for simplicity the invention has illustrated a spur type cutter used in the production of helical gears and a helical cutter used in the production of spur gears, it will of course be apparent that helical gears may be produced by helical cutters, the only requirement being that the master lead mechanism associated with the cutter shall in all cases have a lead corresponding to that of the teeth on the cutter. It may be desirable to employ helical cutters to produce helical teeth on gears in certain cases where the use of a spur cutter might result in the necessity of setting the cutter and work spindles at excessive angles of crossed axes.

It will be understood that the major portion of the cutting done by the roughing teeth, as carried out in the present invention, is done by the top edges of the teeth. Preferably, when the tool is initially formed the cutting teeth are provided with narrow lands as for example .010 inch, in rear of their cutting edges with the result that resharpening by grinding the faces of the teeth does not initially result in reduction of size of the teeth. However, since the roughing teeth are stepped, some reduction of size would be unimportant so long as it did not result in too big a step between the final roughing teeth and the finishing teeth.

Accurate size in the finished gear is of course maintained by providing one or more sets of finishing teeth which may be used in sequence until the last of the sets becomes dull. If the finishing teeth are also provided with lands it will be appreciated that these teeth may also be resharpened without variation in final dimensions of the finished gear.

In order to produce a good finish on the gear teeth as well as to maintain the most accurate control of final dimensions, the finishing teeth are preferably designed so as to take a full cut simultaneously throughout both sides of the tooth space so as to produce smooth accurate flanks on the teeth of the finished gear. In other words, the sequence of roughing teeth in the cutter is maintained at a width somewhat less than that which would be conjugate to a gear of the final desired characteristics. This is then followed by a set of finishing teeth having a width exactly conjugate to a gear of the final desired characteristics so that the finishing teeth during traverse of the work piece through the plane thereof will machine both sides of all gear teeth to the required final dimension and finish.

The drawings and the foregoing specification constitute a description of the improved machine for producing gears in such full, clear, concise and exact terms as to enable any person skilled in the art to practice the invention, the scope of which is indicated by the appended claims.

What I claim as my invention is:

1. A machine for producing gears comprising a frame, a work slide mounted for rectilinear movement on said frame, a rotary work support on said work slide for supporting a work piece with its axis parallel to the direction of movement of said work slide, a tool slide mounted for rectilinear movement on said frame in a plane parallel to the direction of movement of said work slide and in a direction in such plane making an angle of between 5 degrees and 45 degrees therewith, a rotary tool support on said tool slide for supporting a tool with its axis parallel to the direction of movement of said tool slide, an elongated rotary tool on said tool support having a plurality of sets of cutting teeth, the teeth of each set being disposed in a plane perpendicular to the axis of the tool, and corresponding teeth of said sets being disposed in a series aligned longitudinally of said tool, the teeth of each aligned series being stepped, said cutter including at least one set of finishing teeth, drive means for driving said tool and work supports in rotation in timed relation, means for advancing said tool slide to bring the plane of the set of finishing teeth into centrally intersecting relation to the plane of the adjacent ends of the teeth generated on a work piece and arresting said tool slide, and means for thereafter advancing said work slide to advance the work piece axially through the plane defined by the set of finishing teeth.

2. A machine as defined in claim 1 which comprises means for adjusting the relative direction of movement of said slides.

3. A machine as defined in claim 1 which comprises a master lead bar and nut in the means for driving each of said work and tool supports having a lead corresponding to the lead of the work and tool respectively.

4. A machine as defined in claim 3 in which the means for advancing said tool and work slides is independent of the means for driving said tool and work supports.

5. A machine for producing gears comprising a rotary gear support and a rotary tool support disposed with their axes non-intersecting and crossing at an angle between 5 degrees and 45 degrees, drive means for driving said supports in rotation in accurately timed relation, feed means for advancing said tool support in a roughing stroke parallel to its axis and for arresting said tool support in predetermined axially advanced position, and means for thereafter advancing said work support in a finishing stroke parallel to its axis to a predetermined axially advanced position.

6. A machine as defined in claim 5 which comprises master lead bar means in the drive means for driving said tool and work supports having a lead corresponding to the lead of the tool and work respectively.

7. A machine as defined in claim 5 which comprises means for disconnecting the drive means to one of said supports during advance of said work support in a finishing stroke.

8. A machine for producing gears comprising an elongated cylindrical cutter having a plurality of axially spaced sets of cutting teeth, the teeth of each set being disposed in a plane perpendicular to the axis of said cutter, corresponding teeth in the sets being disposed in a series aligned longitudinally of the cutter, the teeth of consecutive axially spaced sets being progressively stepped from one end of said cutter, said cutter including at least one set of finishing teeth, a cutter support for supporting said cutter for rotation and for axial advance, a work support for supporting a work piece with its axis non-intersecting and crossing the axis of the cutter at an angle between 5 degrees and 45 degrees, means for driving said supports in timed relation at cutting speeds, means for advancing said cutter support axially at feeding speeds to a position in which said finishing set of teeth come into action, and means for thereafter advancing said work support axially at feeding speeds to distribute the action of said set of finishing teeth from end to end of the teeth generated on a work piece.

9. A machine as defined in claim 8 in which the corresponding teeth in said sets are in helical alignment.

10. A machine as defined in claim 8 in which the means for driving said supports in timed relation comprises interconnected gearing arranged to drive said supports at a speed ratio determined solely by the number of teeth in each set in the cutter, and the number of teeth to be cut in the work gear, and additional means for superimposing on the rotation of each of said supports an additional rotation determined solely by its lead and axial movement.

11. A machine as defined in claim 10 in which said additional means comprises gear members in said gearing having splined holes and spline shafts thereon, one of said splined holes and spline shafts being axially aligned with the cutter and work gear respectively and having a lead equal to the lead of the cutter and work gear respectively.

12. A combined gear roughing and finishing apparatus comprising a rotary cutter support, an elongated broach-like cutter carried thereby having a plurality of sets of cutting teeth disposed in planes perpendicular to the axis of the cutter, corresponding teeth of consecutive sets being in longitudinal alignment, said teeth being radially stepped in consecutive increments of several hundredths of an inch, a rotary work support for locating a work gear with its axis crossed with the axis of the cutter at an angle of between 5 and 45 degrees in position to be engaged by the first set of cutter teeth upon axial advance of said cutter, means for rotating said cutter and work support in timed relation determined solely by the number of teeth in a set of cutter teeth and in the work gear, means responsive to axial advance of each of said supports for superimposing additional angular movement thereto in accordance with the lead of the teeth of the cutter and work gear respectively whereby proper angular positions of the gear and cutter is entirely independent of axial movement thereof, means for advancing said cutter support axially to a position in which one of the last sets of cutter teeth is in position to initiate a cut on the work piece and for arresting the cutter support in such position, means for thereafter advancing said work support axially to cause said one set of cutter teeth to extend a finishing cut completely across the work gear.

13. A machine as defined in claim 8 which comprises means for disconnecting the drive to one of said supports during axial advance of said work support.

14. A machine as defined in claim 13 in which said cutter includes serrated tooth portions disposed adjacent said set of finishing teeth to shave the teeth generated on the work piece by said sets of teeth.

15. The method of making gears which comprises positioning a gear blank and a cutter having a plurality of axially spaced sets of cutting teeth, each set being disposed in a plane perpendicular to the axis of the cutter, and the sets being progressively stepped longitudinally of the cutter, with the axes of said gear blank and cutter crossed at an angle between 5 degrees and 45 degrees, driving the gear blank and cutter in timed relation, relatively feeding the gear blank and cutter in a direction parallel to the axis of the cutter to rough-cut teeth in the gear blank, and thereafter relatively feeding the gear blank and cutter in a direction parallel to the axis of the gear blank to move the gear blank fully through a plane containing a single set of cutting teeth to finish cut the gear teeth.

16. The method as defined in claim 15 in which rotation of said gear blank and cutter is at a speed in excess of 300 surface feet per minute.

17. The method as defined in claim 15 in which relative feed parallel to the axis of the cutter is accomplished by feeding the cutter axially, and which comprises controlling the rotational position of the cutter in accordance with axial advance thereof in conjunction with the angularity of series of longitudinally aligned cutting teeth thereon.

18. The method as defined in claim 15 in which relative feed parallel to the axis of the gear blank is accomplished by feeding the gear blank axially, and which comprises controlling the rotation position of the gear blank in accordance with axial advance thereof in conjunction with the angularity of the teeth formed thereon by the operation.

19. A rotary cutter for use in generating a gear from a solid blank by rotation at cutting speed in engagement at crossed axes therewith while being fed axially, said cutter comprising an elongated cylindrical body having axially spaced stepped sets of generating teeth, the teeth of each set being disposed in a plane perpendicular to the axis of the cutter, the corresponding teeth of the several sets being disposed in longitudinally aligned series, the teeth of each series consisting of roughing teeth for cutting tooth spaces in the solid blank and at least one finishing tooth, adjacent longitudinally aligned roughing teeth being progressively stepped in height by an amount which precludes the use of the tool as a broach, the amount of the steps between adjacent teeth being several hundredths of an inch.

20. A cutter as defined in claim 19 in which a plurality of sets of finishing teeth of identical size are provided at the end of said cutter.

21. A cutter as defined in claim 19 in which the teeth of said finishing set have finish cutting edges at one end and have unrelieved, grooved shaving side portions.

References Cited in the file of this patent

UNITED STATES PATENTS

| | | |
|---|---|---|
| 2,122,803 | Schurr | July 5, 1938 |
| 2,242,036 | Lapointe | May 13, 1941 |
| 2,320,787 | Mentley | June 1, 1943 |
| 2,499,167 | Sanborn | Feb. 28, 1950 |
| 2,660,929 | Praeg | Dec. 1, 1953 |
| 2,669,905 | Miller | Feb. 23, 1954 |